(12) United States Patent
Suzuki et al.

(10) Patent No.: US 7,058,281 B2
(45) Date of Patent: Jun. 6, 2006

(54) RECORDING AND REPRODUCING APPARATUS, AND VARIABLE SPEED REPRODUCING METHOD USING SAME

(75) Inventors: Satoshi Suzuki, Tokyo (JP); Takeo Morinaga, Kanagawa (JP); Iwao Yamamoto, Tokyo (JP)

(73) Assignee: Sony Corporation (JP)

( * ) Notice: Subject to any disclaimer, the term of this patent is extended or adjusted under 35 U.S.C. 154(b) by 1156 days.

(21) Appl. No.: 10/021,489

(22) Filed: Oct. 29, 2001

(65) Prior Publication Data

US 2002/0118951 A1     Aug. 29, 2002

(30) Foreign Application Priority Data

Oct. 30, 2000   (JP)   ............................ P2000-330260

(51) Int. Cl.
  *H04N 5/91*   (2006.01)
  *H04N 5/95*   (2006.01)
(52) U.S. Cl. .......................................... 386/68; 386/85
(58) Field of Classification Search .................. 386/68, 386/85, 71, 86, 87, 113, 124, 109, 6, 46, 1, 386/13, 21, 40
See application file for complete search history.

(56) References Cited

U.S. PATENT DOCUMENTS 6,950,604 B1 *   9/2005   Kato et al. ..................... 386/98
6,996,327 B1 *   2/2006   Park et al. ..................... 386/95

* cited by examiner

*Primary Examiner*—Robert Chevalier
(74) *Attorney, Agent, or Firm*—Lerner, David, Littenberg, Krumholz & Mentlik, LLP

(57) ABSTRACT

When a variable speed reproduction of a low-time speed like an overtaking reproduction is executed by using an MPEG2 stream, deterioration in picture quality is prevented and low costs are realized. An arrival time of an input TS packet is added by an input counter and the resultant TS packet is recorded onto an HDD. When the TS packet is reproduced from the HDD, the arrival time is extracted from the reproduced TS packet. The arrival time is compared with an output time. When the arrival time reaches a time corresponding to the output time, the TS packet reproduced from the HDD is output. The time base of an output counter is fluctuated by a variable speed counter, thereby enabling the time base at the time of reading out the TS packet from the HDD to be slightly shifted from the time base at the time of recording the TS packet onto the HDD. Thus, a micro variable speed reproduction can be performed. The overtaking reproduction can be performed by such a micro variable speed reproduction.

7 Claims, 6 Drawing Sheets

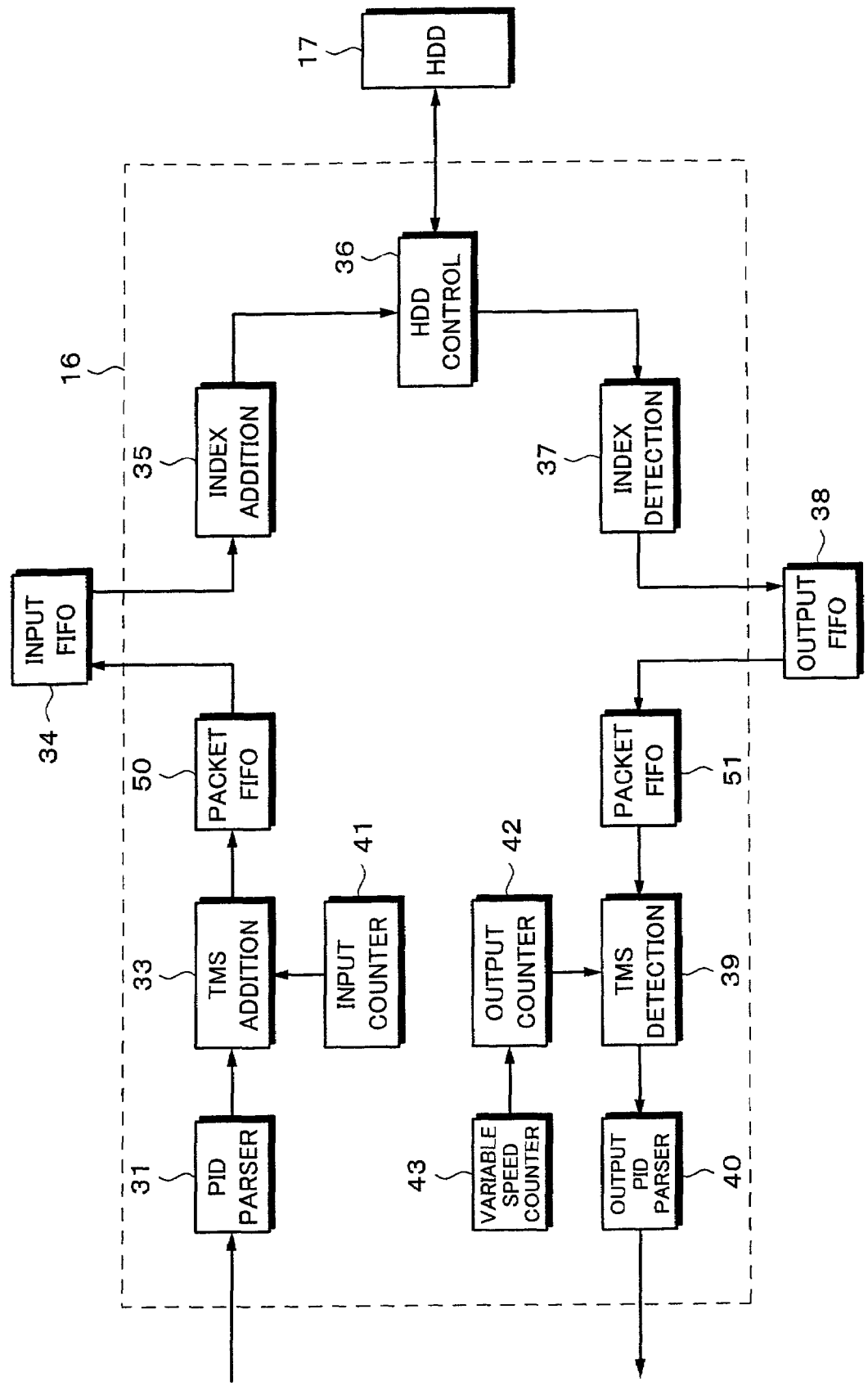

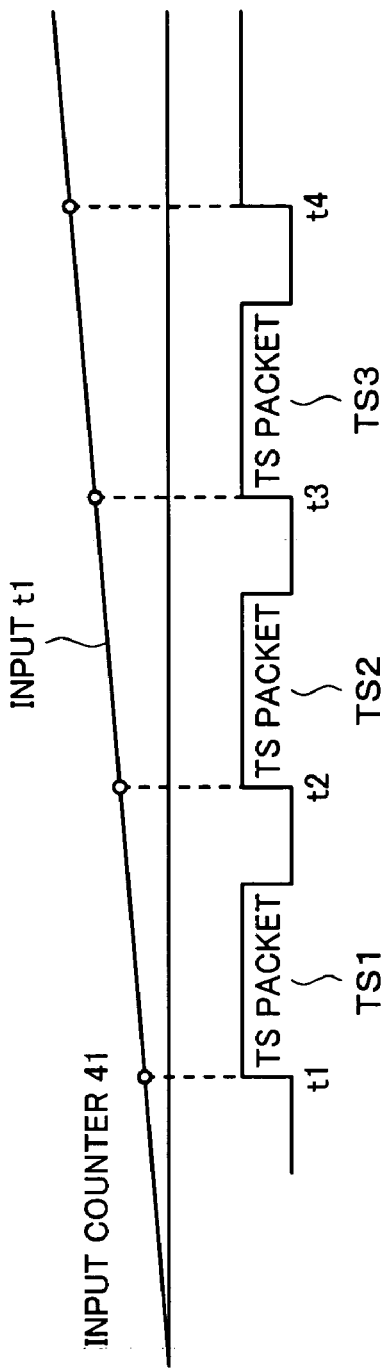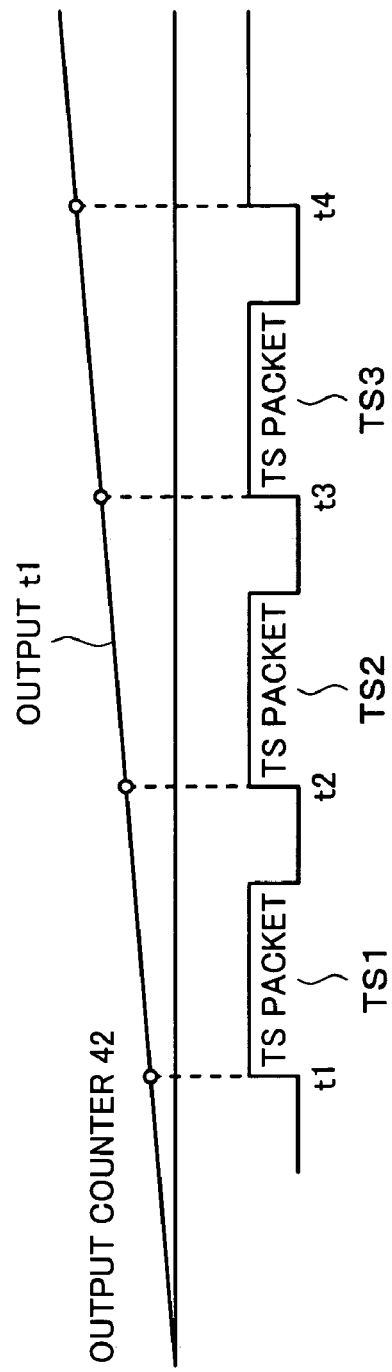
Fig. 4A Fig. 4B Fig. 4C Fig. 4D

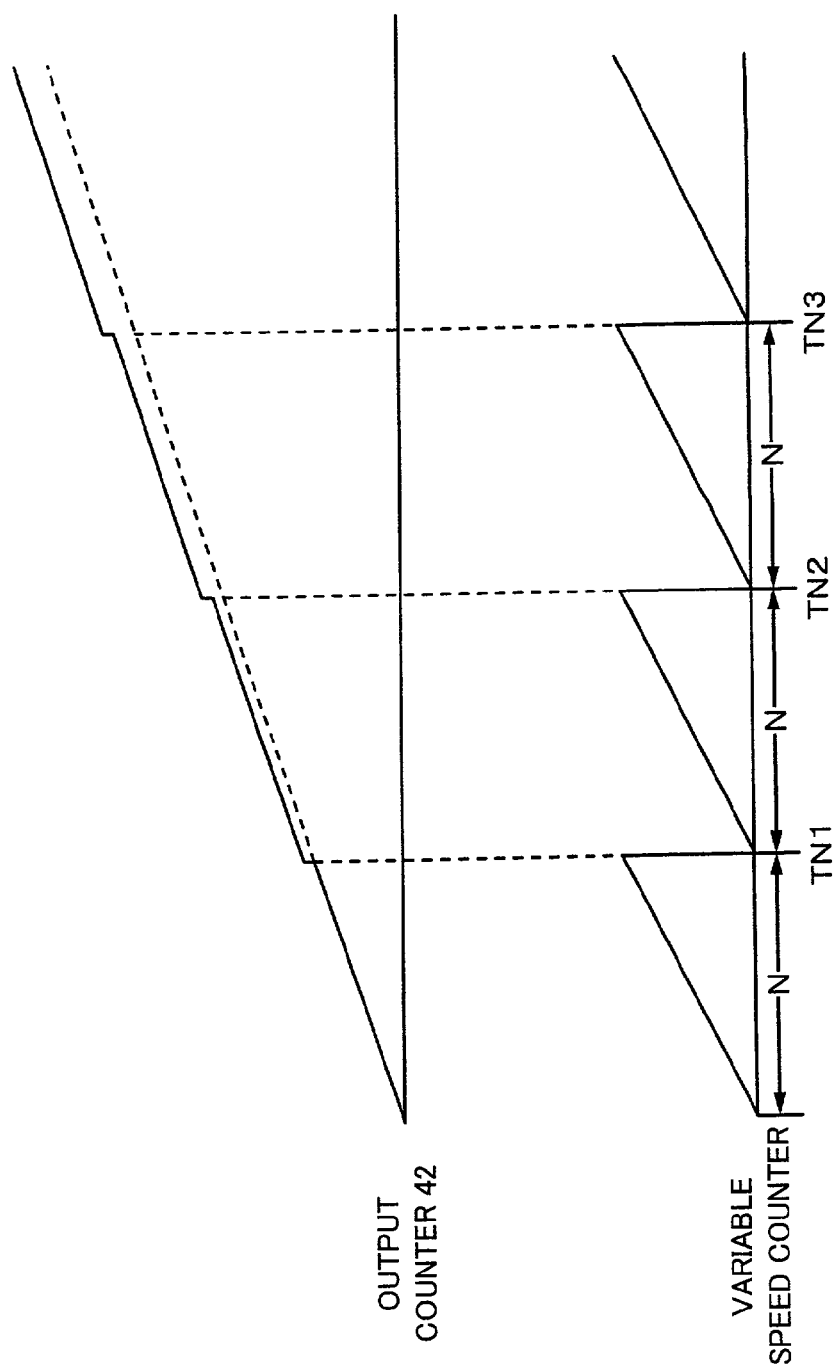

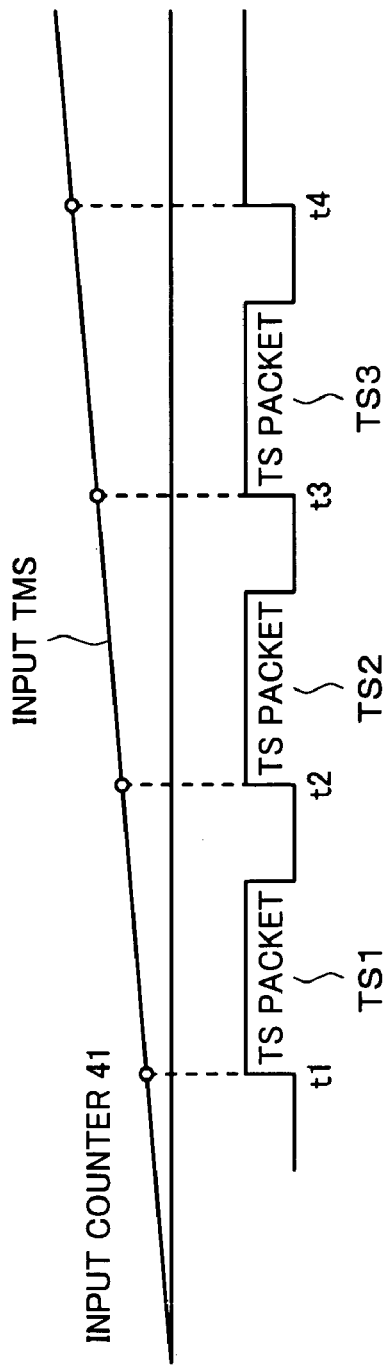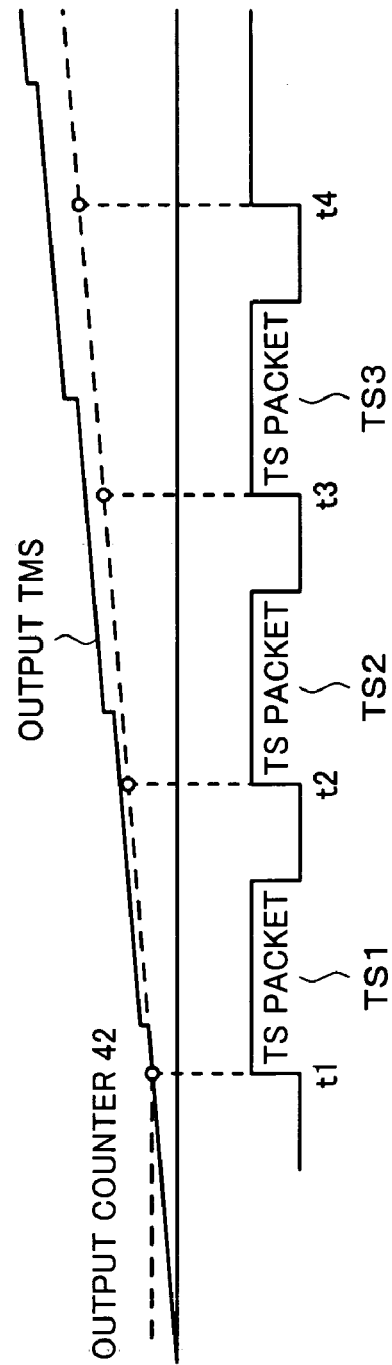
Fig. 6A
Fig. 6B
Fig. 6C
Fig. 6D

RECORDING AND REPRODUCING APPARATUS, AND VARIABLE SPEED REPRODUCING METHOD USING SAME

CROSS-REFERENCE TO RELATED APPLICATIONS

The present application claims priority from Japanese Application No. 2000-330260 filed Oct. 30, 2000, the disclosure of which is hereby incorporated by reference herein.

BACKGROUND OF THE INVENTION

The present invention relates to a recording and reproducing apparatus and a variable speed reproducing method using same which are suitable for use in execution of a variable speed reproduction in an IRD (Integrated Receiver Decoder) for recording an MPEG (Motion Picture Experts Group) 2 TS stream onto an HDD (Hard Disk Drive) once.

Digital BS (Broadcast Satellite) broadcasts and digital CS (Communication Satellite) broadcasts have begun to spread. In the digital BS broadcast, video data and audio data are transmitted by an MPEG2 TS stream. To receive such a digital BS broadcast, an apparatus called an IRD is connected to a television receiver. In the IRD, a signal of a desired channel is selected from a reception signal and a video signal and an audio signal are decoded therefrom. The decoded video signal and audio signal are supplied to the TV receiver. A received program of the digital BS broadcast is reproduced by the TV receiver.

As such an IRD of the digital BS broadcast, there is an IRD having an HDD for accumulating the received MPEG2 TS stream. The HDD is used, for example, for accumulating data in a data broadcast or recording a program. When the user has to temporarily leave the TV receiver, the IRD having such an HDD can be used for recording a program which is broadcast while he is away.

Consider, for example, the case where a clerk of a door-to-door parcel delivery service suddenly visits the user when the user is watching a program on the TV receiver. In such a case, since the user has to temporarily leave the TV receiver, he misses the program while he is away. In the case where he is watching a program such as a movie, if he misses a scene in the program, he may lose the context of the scene he missed in the story.

According to the IRD with the HDD, the program is always recorded on the HDD. When the user has to temporarily leave the TV receiver, he operates the TV receiver so as to freeze the received image there and leaves the TV receiver. Even while the user is away from the TV receiver, the received program is recorded onto the HDD.

When the user returns and the frozen state is cancelled, the program recorded on the HDD is reproduced from the position in which the image was frozen. Thus, even if the user has to temporarily leave the TV receiver, he avoids having to miss the program.

On the other hand, the program which is reproduced by the TV receiver when the user returns after he temporarily left the TV receiver as mentioned above is not a program which is actually being broadcast at present, but a program which has already been broadcast a little while before and which has been accumulated on the HDD. If the program which is reproduced from the HDD is fast-forwarded at a speed that is slightly faster than the current time base, the program which is reproduced from the HDD can catch up with the program which is actually being broadcasted at present. By controlling the speed of reproduction from the HDD so that the reproduced program catches up with the program which is actually being broadcast, the program reproduced from the HDD may be switched to the program which is actually being broadcast, and the user is able to watch the program which is actually being broadcast at present from this time point. Such a reproduction is called an overtaking reproduction. The overtaking reproduction is a variable speed reproduction which is executed at a speed that is slightly faster than the normal reproducing speed.

The data which is recorded onto the HDD is an MPEG2 stream. According to the MPEG2 system, three kinds of picture planes called I (Intra) picture, P (Predictive) picture, and B (Bidirectionally Predictive) picture are transmitted. In the I picture, a DCT (Discrete Cosine Transform) encoding is executed by using pixels of the same frame. In the P picture, a motion compensation prediction is executed with reference to the I picture or P picture which has already been encoded, and the difference obtained as a result of such a prediction is encoded. In the B picture, a motion prediction is executed with reference to the I pictures or P pictures before and after the current picture, and the difference obtained as a result of such a prediction is encoded.

In such an MPEG2 encoding, the picture encoded in the picture plane is only the I picture. Therefore, upon variable speed reproduction, generally, only the data of the I picture is extracted from the stream and only this I picture is decoded.

However, if only the I picture is decoded and variable speed reproduction is executed, since the information of the B picture and the P picture existing during the variable speed reproduction is not reproduced, the motion is not smooth and the picture quality deteriorates. In particular, if only the I picture is reproduced and the overtaking reproduction is executed, a clear difference in the picture quality appears between the image obtained before the reproduced program catches up with the program which is being broadcast at present and the image obtained after it has caught up with the current program, so that the user has a strange impression. It is not easy to extract and reproduce only the I picture from the stream which is reproduced from the HDD. A construction for this purpose becomes complicated, resulting in an increase in costs.

SUMMARY OF THE INVENTION

It is, therefore, an object of the invention to provide a recording and reproducing apparatus and a variable speed reproducing method of the recording and reproducing apparatus in which, when a micro variable speed reproduction like an overtaking reproduction is executed in an MPEG2 stream, picture quality is not deteriorated and low costs can be realized.

According to the invention, there is provided a recording and reproducing apparatus including an input counter operable to generate an arrival time of an input TS packet; a time adder operable to add the arrival time to the input TS packet; a recording medium; a controller operable to control recording so that the TS packet to which the arrival time has been added is recorded onto the recording medium and to control reproduction so that the TS packet to which the arrival time has been added is reproduced from the recording medium; an output counter operable to generate an output time of the packet reproduced from the recording medium; a variable speed counter operable to fluctuate a time base of the output time generated by the output counter; and an output controller operable to control reproduction so that the arrival time of the TS packet reproduced from the recording medium is extracted and compared with the output time, and when the arrival time reaches a time corresponding to the output time, the TS packet reproduced from the recording medium is output, wherein the time base of the output time generated by the output counter is fluctuated by the variable speed counter, thereby executing a variable speed reproduction.

According to the invention, a recording and reproducing apparatus and method and a digital broadcast receiving apparatus for such a recording and reproducing apparatus are also provided.

By the variable speed counter, the time base at the time when the TS packet is read out from the recording medium can be slightly shifted more than the time base at the time when the TS packet is recorded onto the recording medium. Therefore, a value of the SCR or PCR is slightly shifted more than the actual time base and the time of the STC serving as a reference of the system can be slightly shifted from the actual time base. Thus, micro variable speed reproduction can be performed. The overtaking reproduction can be performed by such micro variable speed reproduction. Unlike the case of extracting only the I picture and executing variable speed reproduction, the variable speed reproduction is executed by using all of the B picture, P picture, and I picture and the information is not decimated at all. Consequently, even at the time of variable speed reproduction, almost the same picture quality as that upon normal reproduction can be obtained.

The above and other objects and features of the present invention will become apparent from the following detailed description and the appended claims with reference to the accompanying drawings.

BRIEF DESCRIPTION OF THE DRAWINGS

FIG. 3 is a block diagram showing the functions of a construction of an HDD controller in the IRD for satellite broadcasts to which the invention can be applied;

FIGS. 4A to 4D are timing charts for use in explaining an embodiment of the invention;

FIGS. 5A and 5B are timing charts for use in explaining the embodiment of the invention; and FIGS. 6A to 6D are timing charts for use in explaining the embodiment of the invention.

DETAILED DESCRIPTION

Figure 1:
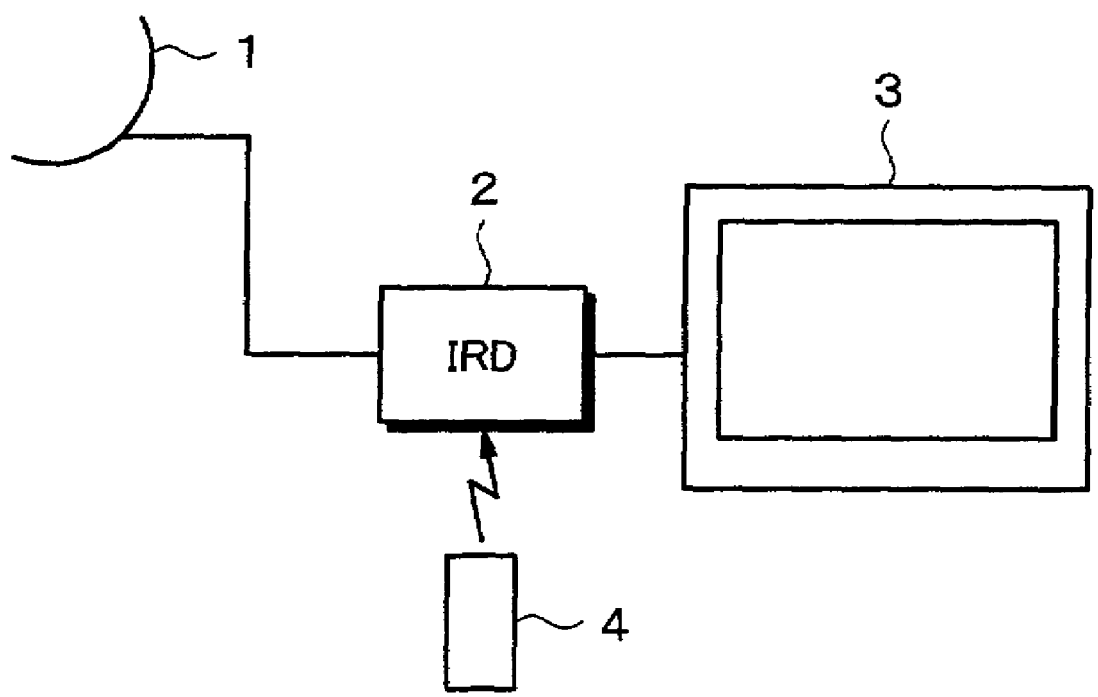
FIG. 1 is a block diagram showing the construction of a reception system for satellite broadcasts.

An embodiment of the invention will now be described hereinbelow with reference to the drawings. FIG. 1 shows an example of a reception system for digital BS broadcasts to which the invention can be applied. In FIG. 1, a signal which is transmitted from a satellite is received by a parabolic antenna 1 and supplied to an IRD 2. In the IRD 2, a signal of a desired channel is selected from the reception signal and a video signal and an audio signal are decoded. The decoded video signal and audio signal are supplied to a television receiver 3. The IRD is operated by a remote controller 4.

An HDD is provided for the IRD 2. For example, the HDD is used for accumulating data in data broadcasts or for recording a program. When the user has to temporarily leave the TV receiver, the IRD having such an HDD is used for recording a program which is broadcast while he is away.

Figure 2:
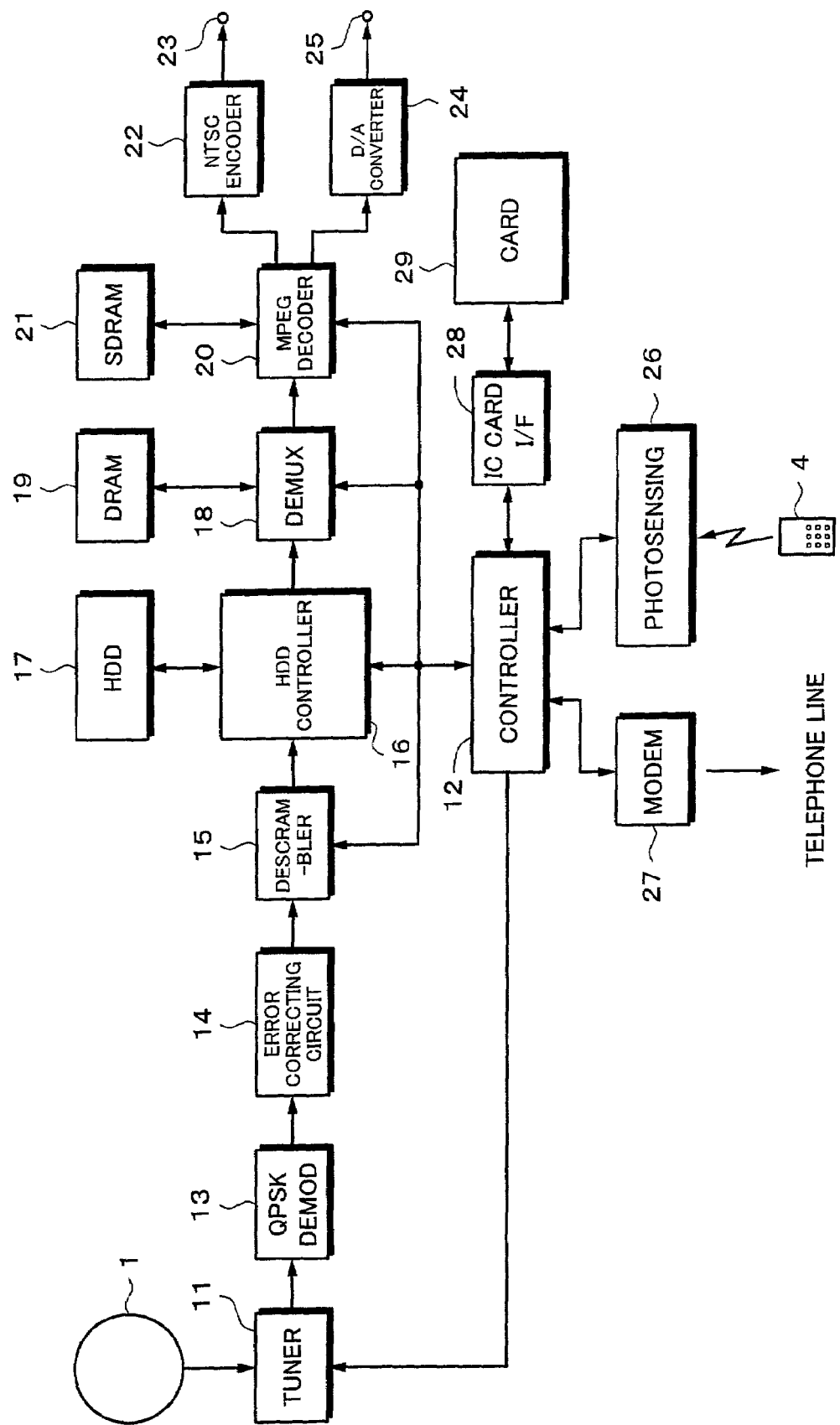
FIG. 2 is a block diagram showing an example of a construction of an IRD for satellite broadcasts to which the invention can be applied.

FIG. 2 shows a construction of the IRD. In FIG. 2, the reception signal of the parabolic antenna 1 is supplied to a tuner circuit 11. In the tuner circuit 11, a signal of a predetermined carrier frequency is selected from the reception signal on the basis of a setting signal from a controller 12.

An output of the tuner circuit 11 is supplied to a demodulating circuit 13. In the demodulating circuit 13, a demodulating process of QPSK (Quadrature Phase Shift Keying) is executed. An output of the demodulating circuit 13 is supplied to an error correcting circuit 14. An error correcting process is executed by the error correcting circuit 14.

An output of the error correcting circuit 14 is supplied to a descrambler 15. ECM (Entitlement Control Message) data and EMM (Entitlement Management Message) data which were received are input to the descrambler 15. Key data for descrambling which has been stored in an IC card 29 loaded into a card interface 28 is also supplied to the descrambler 15. The descrambler 15 descrambles an MPEG2 data stream by using the received ECM data and EMM data and the key data of the IC card 29.

Descrambled data from the descrambler 15 is recorded once onto an HDD 17 under the control of an HDD controller 16. The data recorded on the HDD 17 is read out under the control of the HDD controller 16 and supplied to a demultiplexer 18. A DRAM 19 is provided for the demultiplexer 18.

The demultiplexer 18 separates a desired packet from the stream read out from the HDD 17 through the HDD controller 16. A packet identifier (PID) is provided in a header portion of the transmission packet. In the demultiplexer 18, a video packet and an audio packet of a desired program are extracted on the basis of the PID.

The video packet and audio packet are supplied to an MPEG2 decoder 20. An SDRAM 21 is provided for the MPEG2 decoder 20. In the MPEG2 decoder 20, video data and audio data are decoded.

The decoded video data is supplied to an NTSC encoder 22. In the NTSC encoder 22, a video signal of the NTSC system is formed. The video signal is output from a video output terminal 23.

The decoded audio data is supplied to a D/A converter 24. In the D/A converter 24, the digital audio data is converted into an analog audio signal. This audio signal is output from an audio output terminal 25.

An input signal to the IRD is supplied from the remote controller 4 through a photosensing unit 26. A modem 27 is also provided. Charge information is sent to a broadcast station or charge center by the modem 27 through a telephone line.

FIG. 3 is a block diagram showing functions of the HDD controller 16. In FIG. 3, the TS packet stream from the descrambler 15 is supplied to a PID parser 31. In the PID parser 31, only the necessary designated TS packets are extracted.

An output of the PID parser 31 is sent to a TMS (Time Stamp) addition block 33. An input counter 41 is provided for the TMS addition block 33. An arrival time of the input packet is measured in the input counter 41. In the TMS addition block 33, the arrival time (TMS) of the TS packet is recorded on the basis of an output of the input counter 41 and this TMS is added to each TS packet and defined as one packet.

An output of the TMS addition block 33 is sent to an input FIFO 34 through a packet FIFO 50. The input FIFO 34 is provided for absorbing a difference between the time of the input TS packet and the time of the TS packet which is recorded onto the HDD 17. When a certain amount of TS packets have been accumulated in the FIFO 34, the TS packets are transferred to the HDD 17 by a DMA (Direct Memory Access) transfer from an HDD control block 36.

An output of the input FIFO 34 is sent to an index addition block 35. The index addition block 35 is used for adding index information showing at which position on the HDD 17 the TS packet has been recorded. An output of the index addition block 35 is sent to the HDD 17 on a cluster unit basis through the HDD control block 36 and recorded onto the HDD 17.

In case of reading out the data from the HDD 17, the data is read out from the HDD 17 by the DMA transfer from the HDD control block 36. This data is sent to an output FIFO 38 through an index detection block 37.

The output FIFO 38 is used for absorbing a time difference between the time of the data which is output and the time of the data which is read out from the HDD 17. Since the data added in the index addition block 35 exists mixedly in the data which is DMA transferred, this data is extracted by the index detection block 37.

An output of the output FIFO 38 is sent to a TMS detection block 39 through a packet FIFO 51. An output counter 42 and a variable speed counter 43 for slightly changing a time base of the output counter 42 are provided for the TMS detection block 39. In the TMS detection block 39, the TMS added every packet is detected. The output time is measured by the output counter 42. When the time of the TMS detected by the TMS detection block 39 reaches the corresponding time, the TS packet is output from the TMS detection block 39. This TS packet is supplied to an output PID parser 40. In the output PID parser 40, the necessary TS packets are extracted and the TS stream is output from the PID parser 40.

As mentioned above, in the HDD controller 16, when the TS packet is recorded onto the HDD 17, in the TMS addition block 33, the TMS indicative of the arrival time of the packet is added and when the TS packet is reproduced from the HDD 17, the TMS is detected by the TMS detection block 39. When the current time reaches the time corresponding to the time shown by the TMS, the TS packet is output, thereby enabling the TS packet to be output from the HDD 17 by a time base similar to the time when the data was recorded onto the HDD 17.

That is, FIGS. 4A to 4D show timings of recording the TS packet onto the HDD 17 while adding the TMS. The input counter 41 for generating the TMS is provided for the TMS addition block 33. As shown in FIG. 4A, the input TMS is advanced by the input counter 41.

As shown in FIG. 4B, when the TS packet is input, the TMS is loaded from the input counter 41 and this TMS is added. That is, in FIG. 4B, when a TS packet TS1 is input, the value (TMS=t1) of the input counter is loaded. When a TS packet TS2 is input, the value (TMS=t2) of the input counter is loaded. When a TS packet TS3 is input, the value (TMS=t3) of the input counter is loaded. The TS packets to which the TMSs have been added as mentioned above are recorded onto the HDD 17.

The output counter 42 is provided for the TMS detection block 39. As shown in FIG. 4C, an output TMS is advanced by the output counter 42. The input counter 41 and output counter 42 are advanced by similar clocks.

As shown in FIG. 4D, when a value of the output counter 42 is equal to (TMS=t1), the TS packet TS1 is output. When the value of the output counter 42 is equal to (TMS=t2), the TS packet TS2 is output. When the value of the output counter 42 is equal to (TMS=t3), the TS packet TS3 is output.

As mentioned above, by advancing the input counter 41 in the TMS addition block 33 and the output counter 42 in the TMS detection block 39 by similar clocks, the TS packets can be output from the HDD 17 by the same time base as that upon recording.

In the embodiment of the invention, the variable speed counter 43 is further provided. The counting operation of the variable speed counter 43 is executed by the same clock as that of the output counter 42. A predetermined value A is set into the variable speed counter 43. When a count value of the variable speed counter 43 reaches the predetermined value A, a count value of the output counter 42 is advanced by a predetermined value B.

That is, the output counter 42 is advanced as shown in FIG. 5A. The variable speed counter 43 is advanced as shown in FIG. 5B. A predetermined value N is set into the variable speed counter 43. At time points TN1, TN2, TN3, . . . when the count value of the variable speed counter 43 reaches the predetermined value N, the count value of the output counter 42 is counted up by a predetermined value (small number; for example, 1). Thus, as shown in FIG. 5A, the time base of the output counter 42 is slightly advanced from that in the normal case (shown by a broken line). As mentioned above, by providing the variable speed counter 43, the time base of the TMS which is output from the output counter 42 can be slightly shifted more than the time base in the normal case.

As shown in FIG. 6A, the TMS is advanced by the input counter 41. As shown in FIG. 6B, when the TS packets TS1, TS2, TS3, . . . are input, the TMSs (t1, t2, t3, . . . ) are loaded and these TMSs (t1, t2, t3, . . . ) are added.

The variable speed counter 43 is provided for the output counter 42. A predetermined value is set into the variable speed counter 43. When the count value of the variable speed counter 43 reaches the predetermined value, the output counter 42 is slightly advanced. Thus, as shown in FIG. 6C, the output counter 42 is advanced by slightly advancing the time base more than that in the normal case.

As shown in FIG. 6D, when the count value of the output counter is equal to (TMS=t1), the TS packet TS1 is output. When the value of the output counter is equal to (TMS=t2), the TS packet TS2 is output. When the value of the output counter is equal to (TMS=t3), the TS packet TS3 is output.

In this case, since the time base of the TMS which is output from the output counter 42 has slightly been advanced more than that in the normal case, the time base of the TS packet stream at the time when the stream is output is slightly faster than that of the TS packet stream at the time when the stream is input to the HDD controller 16.

As mentioned above, if the time base of the TS packet stream at the time when the stream is output from the HDD 17 is slightly faster than that of the TS packet stream at the time when the stream is input to the HDD controller 16, micro variable speed reproduction can be performed.

That is, the time stamp has been added to the packet header of the MPEG2 TS packet. As such a time stamp, there are two kinds of stamps such as PTS (Presentation Time Stamp) and DTS (Decoding Time Stamp). In the MPEG2 system, the time shown by an STC (System Time Clock) serving as a reference of the system is compared with the time shown by the PTS. When the time shown by the STC coincides with that shown by the PTS, its access unit is reproduced, and the reproducing time is managed in this manner.

An SCR (System Clock Reference (system clock reference value)) and a PCR (Program Clock Reference (program clock reference value)) are sent into the TS packet for the purpose of setting and calibrating the STC serving as a reference of the time. The SCR is constructed by 5 bytes and the PCR is constructed by 6 bytes. On the decoder side, the STC is set to a value shown by the SCR or PCR at a moment when the last byte arrives, and the STC is calibrated.

A value of the STC counter is counted by a value of a VCO (Voltage Controlled Oscillator). The value of the STC counter is compared with that of the SCR or PCR. The STC synchronized with the system clock can be formed by a PLL (Phase Locked Loop) such that the VCO is controlled on the basis of an output of such a comparison.

If the time base of the TS stream at the time when the stream is output from the HDD controller 16 is set to be slightly faster than that of the TS stream at the time when the stream is input to the HDD 17, the value of the SCR or PCR is also advanced in association with it. In the case where the value of the SCR or PCR has been advanced more than the actual time base by a micro time, the value of the STC is calibrated by the value of the SCR or PCR, so that the STC is slightly advanced more than the actual time base in association with it. That is, in case of a micro fluctuation of the time base, by setting the time base of the TS stream at the time when it is reproduced from the HDD 17 to be slightly faster, the time of the STC serving as a reference of the system is slightly advanced more than the actual time base.

As mentioned above, the reproducing time of MPEG2 is managed in a manner such that the time of the STC serving as a reference of the system is compared with the time shown by the PTS and, if the time shown by the STC coincides with the time shown by the PTS, its accessing unit is reproduced. Therefore, if the STC serving as a reference of the system is slightly advanced more than the actual time base, the reproduction is also executed at a slightly earlier time in accordance with it.

According to the embodiment of the invention as mentioned above, the time base at the time of reading out the TS packet from the HDD is slightly shifted more than the time base at the time of recording the TS packet onto the HDD. Thus, the value of the SCR or PCR is slightly shifted more than the actual time base and the time of the STC serving as a reference of the system is slightly shifted more than the actual time base. Therefore, micro variable speed reproduction can be performed. The overtaking reproduction can be performed by such a micro variable speed reproduction.

If variable speed reproduction has been executed as mentioned above, unlike the case where only the I picture is extracted and variable speed reproduction is executed, the variable speed reproduction is executed by using all of the B picture, P picture, and I picture and the information is not decimated. Consequently, with variable speed reproduction, picture quality which is almost similar to that in normal reproduction can be obtained.

According to the invention, the time base at the time of reading out the TS packet from the HDD can be slightly shifted more than the time base at the time of recording the TS packet onto the HDD. Therefore, the value of the SCR or PCR is shifted slightly more than the actual time base and the time of the STC serving as a reference of the system can be shifted slightly more than the actual time base. Thus, micro variable speed reproduction can be executed. The overtaking reproduction can be performed by such a micro variable speed reproduction. Unlike the case where only the I picture is extracted and variable speed reproduction is executed, the variable speed reproduction is executed by using all of the B picture, P picture, and I picture and the information is not decimated. Consequently, with variable speed reproduction, picture quality which is almost similar to that in normal reproduction can be obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A recording and reproducing apparatus for inputting, recording, reproducing and outputting a stream of TS packets, comprising:
   an input counter operable to generate an arrival time for each of the TS packets input to the apparatus;
   a time adder operable to add said arrival time to respective ones of the TS packets;
   a recording medium;
   a controller operable to control recording so that the TS packets to which said arrival time has been added are recorded onto said recording medium and to control reproduction so that the TS packets to which said arrival time has been added are reproduced from said recording medium;
   an output counter operable to generate an output time for each of the TS packets reproduced from said recording medium;
   a variable speed counter operable to fluctuate a time base of said output times generated by said output counter; and
   an output controller operable to control reproduction so that, for each TS packet reproduced from said recording medium, said arrival time is extracted and compared with said output time, and when said arrival time reaches a time corresponding to said output time, the TS packet reproduced from said recording medium is output,
   wherein a variable speed reproduction is executed by fluctuating said time base of said output times generated by said output counter.

2. An apparatus according to claim 1, wherein said output counter is driven by a first clock and said variable speed counter is driven by a clock different from said first clock, and each time a counting operation of said variable speed counter is executed a predetermined number of times, a value of said output counter is shifted, thereby fluctuating said time base of said output times generated by said output counter.

3. An apparatus according to claim 1, wherein said recording medium is a hard disk drive (HDD).

4. A method for inputting a stream of TS packets, recording the input stream of TS packets, reproducing the recorded stream of TS packets, and outputting the reproduced stream of TS packets, comprising:
   adding an arrival time to each of the TS packets in the input stream;
   recording the TS packets to which the arrival time has been added onto a recording medium;
   generating an output time for each of the TS packets reproduced from the recording medium;
   controlling reproduction so that, for each TS packet reproduced from the recording medium, the arrival time is extracted and compared with the output time, and when the arrival time reaches a time corresponding to the output time, the TS packet reproduced from the recording medium is output; and executing a variable speed reproduction by fluctuating a time base of the output times.

5. A method according to claim 4, wherein the time base of the output times is fluctuated at predetermined intervals.

6. A receiving apparatus for receiving a digital broadcast signal including a stream of TS packets, recording the received digital broadcast signal, and thereafter, reproducing the recorded digital broadcast signal, comprising:

an input counter operable to generate an arrival time for each received TS packet in the digital broadcast signal;

a time adder operable to add said arrival time to respective ones of the received TS packets;

a recording medium;

a controller operable to control recording so that the TS packets to which said arrival time has been added are recorded onto said recording medium, and to control reproduction so that the TS packets to which said arrival time has been added are reproduced from said recording medium;

an output counter operable to generate an output time for each of the TS packets reproduced from said recording medium;

a variable speed counter operable to fluctuate a time base of said output times generated by said output counter; and an output controller operable to control reproduction so that, for each TS packet reproduced from said recording medium, said arrival time is extracted and compared with said output time, and when said arrival time reaches a time corresponding to said output time, the TS packet reproduced from said recording medium is output, wherein a variable speed reproduction is executed by fluctuating said time base of said output times generated by said output counter.

7. An apparatus according to claim 6, wherein said output counter is driven by a first clock and said variable speed counter is driven by a clock different from said first clock, and each time a counting operation of said variable speed counter is executed a predetermined number of times, a value of said output counter is shifted, thereby fluctuating said time base of said output times generated by said output counter.

* * * * *